Sept. 3, 1929. G. A. GILLEN 1,726,530
LOCKING MECHANISM FOR MOTOR VEHICLES
Filed Sept. 22, 1926
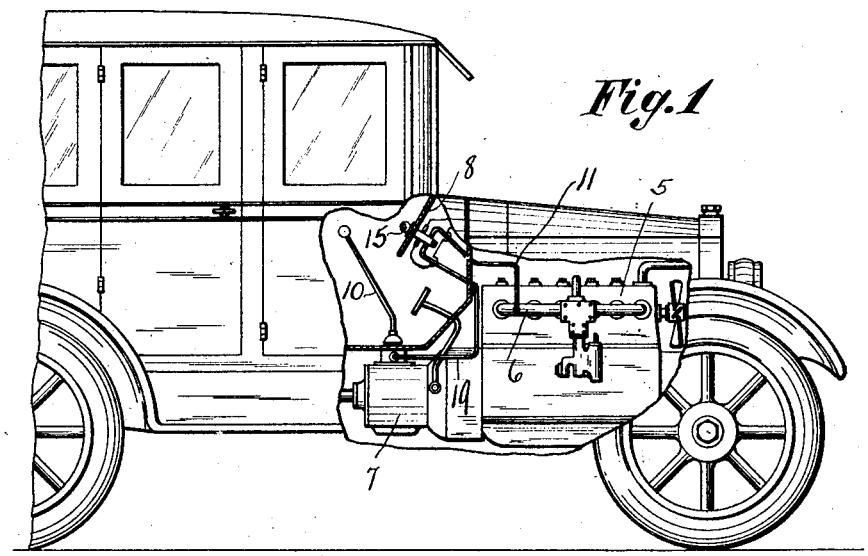
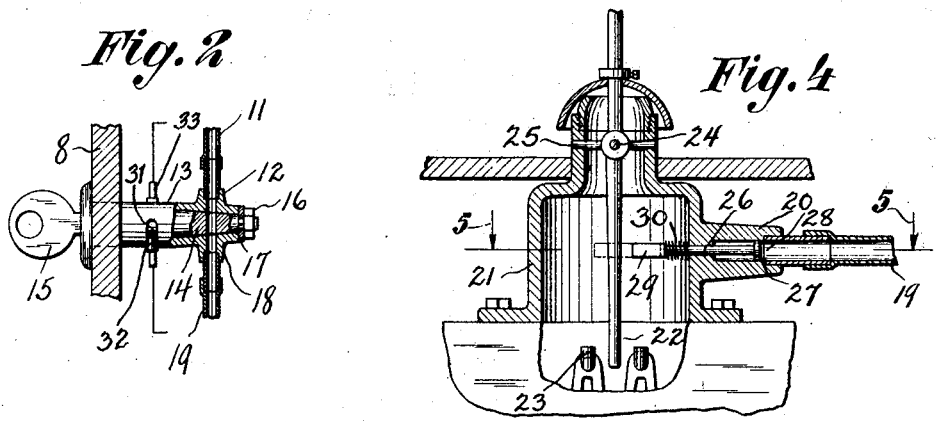
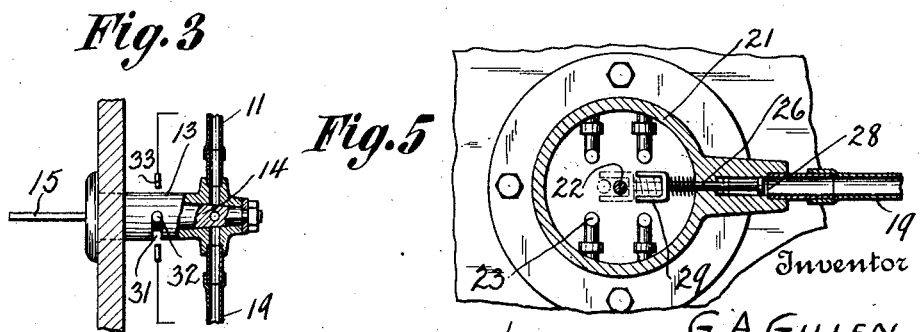

Patented Sept. 3, 1929.

1,726,530

UNITED STATES PATENT OFFICE.

GEORGE A. GILLEN, OF NEW YORK, N. Y., ASSIGNOR TO EQUIPMENT & SUPPLY COMPANY, INC., A CORPORATION OF NEW YORK.

LOCKING MECHANISM FOR MOTOR VEHICLES.

Application filed September 22, 1926. Serial No. 136,980.

This invention relates to motor vehicle locks and more particularly to a novel and improved construction for simultaneously locking the transmission gear shifting lever and breaking the ignition circuit to render the vehicle inoperative.

One of the objects of my invention is to provide a locking means for a motor vehicle by employing the vacuum created in the manifold to operate a lock associated with the transmission gear shifting lever when the vacuum is broken through a suitable valve and simultaneously open the ignition circuit to render the vehicle inoperative.

A further object of my invention is to provide a motor vehicle lock embodying a resiliently controlled plunger rod and yoke cooperating with the transmission gear shifting lever by employing the vacuum created in the manifold to hold said rod and yoke disengaged from the lever in one position and causing the locking means to engage the lever when the vacuum is broken through a suitable valve and key, including further provision for opening the ignition circuit and closing the circuit simultaneously and thus render the machine inoperative.

To enable others skilled in the art to more fully comprehend the underlying features of my invention that the same may be embodied in the practical manner shown in connection with the transmission gear shifting lever of motor vehicles generally, drawings depicting a preferred form of the invention are annexed hereto in which Fig. 1 is a view with parts broken away showing my invention as installed in a conventional type of motor vehicle.

Fig. 2 is a sectional view showing a key controlled valve for simultaneously breaking the vacuum or pressure and opening the ignition circuit.

Fig. 3 is a view similar to Fig. 2 showing the second or locked position of the key controlled valve.

Fig. 4 is an enlarged sectional view showing the relation of the transmission gear shifting lever and the locking yoke within the head of the transmission housing.

Fig. 5 is a sectional view taken substantially on the line 5—5 of Fig. 4.

Referring now to the drawings 5 designates the engine, 6 the manifold and 7 the transmission housing located in the usual and conventional manner in a motor vehicle body and shown in connection with the dash board 8, steering wheel 9 and the gear shifting lever 10.

Tapped in the manifold there is provided a pipe or conduit 11 preferably armor covered and flexible so as to be bent upwardly and extended in proximity to the dash board of the vehicle. The opposite end of the pipe or conduit 11 is connected to a boss 12 of a valve casing 13 on the dash board, the valve body 14 having an opening therethrough communicating with the end of the pipe or conduit 11 and rotatable by a key 15 from its normally open position as shown by Fig. 2 to the locked position illustrated by Fig. 3 of the drawing. The inner end of the valve body is retained by a nut and washer 16, 17, it being understood that the valve may be modified to permit the use of various type keys employed in connection with rotatable valves of this character.

The valve casing is provided with an oppositely disposed boss 18 to which a second armored and flexible pipe or conduit 19 is attached, the opposite end of said pipe or conduit being connected to an extension boss 20 of the transmission head 21 of the transmission housing and through which the lower end 22 of the gear shifting lever 10 extends to engage the shifter forks 23. The shifting lever 10 may be supported in the well known manner as at 24 on the pin 25, being coaxial with the head 21 as clearly illustrated by Fig. 4.

Extending through the boss 20, there is provided a spring controlled plunger rod 26, the head 27 of which is in direct alignment with the open end 28 of the flexible pipe or conduit 19. The opposite end of the plunger rod 26 is equipped with a yoke 29 and between the yoke and wall of the head 21, a resilient spring 30 is positioned whereby the yoke may be shifted from the full line to the dotted line positions as disclosed by Fig. 5 to lock the gear shifting lever 10.

Under normal conditions and when the valve is open, the vacuum within the pipes or conduits 11, 19 tends to draw the plunger rod 26 outwardly against the resistance of the spring and in which position the yoke 29 is disengaged from and permits the free movement of the gear shifting lever. However, when the valve is rotated and the vacuum in the pipe 19 is broken, the spring moves the plunger rod and its yoke 29 outwardly to the dotted line position, thus engaging and preventing the movement of the lever and the actuation of the shifter forks. Due to the gases or vapor of the oil in the transmission housing or casing, the plunger rod is lubricated at all times, works freely and in a certain sense assists the vacuum or pressure required to maintain the rod in its normal or unlocked position. When the vacuum is broken however, the spring is sufficient to shift the rod and engage the lever 10 locking the same.

The valve housing and valve body is also preferably located so as to provide an auxiliary locking means of the ignition circuit. In this connection, I have shown the housing as provided with a slot 31 for the movable contacts 32 on the valve body, said movable contacts cooperating with suitable end contacts 33 of conductors in the ignition circuit. It will thus be seen that the circuit is simultaneously broken and closed when the gear shifting lever is locked and unlocked, providing a dual locking mechanism preventing the unauthorized operation of the vehicle.

Having shown and described my invention, what I now claim as new and desire to secure by Letters Patent of the United States is:

In combination with the gear shifting lever and manifold of an internal combustion engine, a pipe tapped in said manifold leading to a boss on the transmission casing of the engine, a plunger having one end located directly in alignment with the end of the pipe and movable with respect to the boss, said plunger extending into the interior of the said casing, a yoke on the opposite end of the plunger adapted to engage the lower portion of a gear shifting lever in one position, a resilient spring on the plunger between the yoke and the wall of the casing, said plunger being under the control of a vacuum created in the pipe to normally maintain the yoke disengaged from the lever, and a key operated valve in said pipe and contacts carried by said valve for making and breaking an ignition circuit simultaneously with the control of the vacuum within the pipe.

In testimony whereof I affix my signature.

GEORGE A. GILLEN.